United States Patent [19]

La Palm et al.

[11] Patent Number: 5,753,804
[45] Date of Patent: May 19, 1998

[54] SPATIAL FREQUENCY IMPLEMENTED DIGITAL FILTERS FOR ENGINE MISFIRE DETECTION

[75] Inventors: James La Palm, Garden City; Piotr Czapski, Farmington Hills, both of Mich.

[73] Assignee: Chrysler Corporation, Auburn Hills, Mich.

[21] Appl. No.: 695,766

[22] Filed: Aug. 1, 1996

[51] Int. Cl.$^6$ .................. G01M 15/00; F02P 17/00; G01L 3/24

[52] U.S. Cl. .................. 73/116; 73/117.3; 123/419; 123/436; 364/431.07

[58] Field of Search .................. 73/116, 117.2, 73/117.3; 123/419, 425, 436; 364/431.07, 431.08

[56] References Cited

U.S. PATENT DOCUMENTS

| | | | |
|---|---|---|---|
| 3,908,366 | 9/1975 | Masaki | 60/277 |
| 4,179,922 | 12/1979 | Bouverie et al. | 73/116 |
| 4,186,701 | 2/1980 | Suzuki et al. | 123/119 A |
| 4,271,811 | 6/1981 | Suzuki et al. | 123/571 |
| 4,308,519 | 12/1981 | Garcea et al. | 60/277 |
| 4,461,257 | 7/1984 | Hosaka et al. | 123/419 |
| 4,488,528 | 12/1984 | Morikawa | 123/425 |
| 4,491,110 | 1/1985 | Bone et al. | 123/425 |
| 4,532,592 | 7/1985 | Citron et al. | 364/431.05 |
| 4,562,816 | 1/1986 | Kohama et al. | 123/478 |
| 4,606,224 | 8/1986 | Tedeschi et al. | 73/117.3 |
| 4,716,874 | 1/1988 | Hilliard et al. | 123/425 |
| 4,782,692 | 11/1988 | Peden et al. | 73/117.3 |
| 4,846,129 | 7/1989 | Noble | 123/425 |
| 4,862,093 | 8/1989 | Jiewertz | 324/464 |
| 4,886,029 | 12/1989 | Lill et al. | 123/479 |
| 4,928,228 | 5/1990 | Fujimoto et al. | 364/431.09 |
| 4,930,479 | 6/1990 | Osawa et al. | 123/436 |
| 4,930,481 | 6/1990 | Fujimoto et al. | 123/481 |
| 4,932,379 | 6/1990 | Tang et al. | 123/436 |
| 4,936,277 | 6/1990 | Deutsch et al. | 123/436 |
| 4,941,445 | 7/1990 | Deutsch | 123/414 |
| 4,976,241 | 12/1990 | Ishida et al. | 123/425 |
| 4,987,711 | 1/1991 | Noji et al. | 52/167 DF |
| 4,987,771 | 1/1991 | Iwata | 73/117.3 |
| 5,021,960 | 6/1991 | Manaka et al. | 364/431.01 |
| 5,044,194 | 9/1991 | James et al. | 73/112 |
| 5,044,195 | 9/1991 | James et al. | 73/117.3 |

(List continued on next page.)

OTHER PUBLICATIONS

FIR Windowed Filter Design Program — Window, L. R. Rabiner and C. A. McGonegal (pp. 5.2-1 through 5.2-19).

Estimate of IC Engine Torque from Measurement of Crankshaft Angular Position, Girogio Rizzoni and Francis T. Connolly, Ohio State University (SAE Paper No. 932410).

An On-Line Engine Roughness Measurement Technique, William P. Mihelc and Stephen J. Citron, School of Mechanical Engineering, Purdue University (SAE Paper No. 840136).

Cylinder by Cylinder Engine Pressure and Pressure Torque Waveform Determination Utilizing Speed Fluctuations, Stephen J. Citron, John E. O'Higgins, and Lillian Y. Chen, Engine Controls Lab, School of Mechanical Engineering, Purdue University, West Lafayette, Indiana (SAE Paper No. 890486).

(List continued on next page.)

*Primary Examiner*—George M. Dombroske
*Attorney, Agent, or Firm*—Mark P. Calcaterra

[57] ABSTRACT

A digital filter system is used in an internal combustion engine misfire detection system. The digital filter system includes a signal input for inputting a digital signal generated in response to sensed crankshaft angular velocity. A plurality of digital filters is connected to the signal input, with each of the filters being activated over a predetermined range of engine speeds. Each of the plurality of digital filters, upon being activated, operates as a bandpass filter to filter the digital signal at an engine spatial firing frequency and at a predetermined number of multiples of the engine spatial firing frequency. A signal output is also connected to the plurality of digital filters for outputting the filtered digital signal for engine misfire detection purposes.

14 Claims, 4 Drawing Sheets

U.S. PATENT DOCUMENTS

| | | | |
|---|---|---|---|
| 5,056,360 | 10/1991 | Dosdall et al. | 73/116 |
| 5,095,742 | 3/1992 | James et al. | 73/116 |
| 5,109,695 | 5/1992 | James et al. | 73/117.3 |
| 5,117,681 | 6/1992 | Dosdall et al. | 73/116 |
| 5,144,927 | 9/1992 | Denz | 123/425 |
| 5,200,899 | 4/1993 | Ribbens et al. | 364/431.08 |
| 5,231,869 | 8/1993 | Klenk et al. | 73/116 |
| 5,239,473 | 8/1993 | Ribbens et al. | 364/431.08 |
| 5,278,760 | 1/1994 | Ribbens et al. | 364/431.07 |
| 5,313,407 | 5/1994 | Tiernan et al. | 364/508 |
| 5,361,629 | 11/1994 | McCombie | 73/117.3 |
| 5,387,253 | 2/1995 | Remboski, Jr. et al. | 73/117.3 |
| 5,392,641 | 2/1995 | McCombie | 73/117.3 |
| 5,544,521 | 8/1996 | McCombie | 73/117.3 |
| 5,574,217 | 11/1996 | McCombie | 73/116 |
| 5,602,331 | 2/1997 | Prevost | 73/116 |

OTHER PUBLICATIONS

Advanced Signal Processing for Misfire Detection in Automotive Engines, William B. Ribbens and Steven Bieser, ©1995 IEEE.

Analysis and Processing of Shaft Angular Velocity Signals in Rotating Machinery for Diagnostic Applications, Yong W. Kim, Giorgio Rizzoni, Bahman Samimy, Yue Y. Wang, ©1995 IEEE.

Detection of Partial Misfire in IC Engines Using a Measurement of Crankshaft Angular Velocity, Donghyeon Lee (Hyundai Motor Co.) and Giorgio Rizzoni (The Ohio State Univ.) (SAE Paper No. 951070).

Road Test Results of an I-C Engine Misfire Detection System, W.B. Ribbens and J. Park, University of Michigan (SAE Paper No. 930398).

Road Tests of a Misfire Detection System, William B. Ribbens and Jaehong Park, University of Michigan (SAE Paper No. 940975).

A New Metric for Torque Nonuniformity, William B. Ribbens (SAE Paper No. 830425).

Applications of Precise Crankshaft Position Measurements for Engine Testing, Control and Diagnosis, W.B. Ribbens and G. Rizzoni (SAE Paper No. 890885).

A Mathematical Model Based Method for Diagnosing Failures in Automotive Electronic Systems, W.B. Ribbens (SAE Paper No. 910069).

Onboard Diagnosis of Engine Misfires, William B. Ribbens and Giorgio Rizzoni (SAE Paper No. 901768.

Estimate of Indicated Torque from Crankshaft Speed Fluctuations: A Model for the Dynamics of the IC Engine, Giorgio Rizzoni, IEEE Transactions on Vehicular Technology, vol. 38, No. 3, Aug. 1989 (©1990 IEEE).

Crankshaft Position Measurement with Applications to Ignition Timing, Diagnositcs and Performance Measurement, Yibing Dong, Giorgio Rizzoni and William B. Ribbens — ©1987 (SAE Paper No. 871914).

Fast Transforms for Rapid Isolation of Misfiring Cylinders, Giorgio Rizzoni ©1987 (SAE Paper No. 871915).

Torque Nonuniformity Measurements in Gasoline Fueled Passenger Cars Equipped with Automatic Transmission — Theory and Experimental Results, W.B. Ribbens and D. Gross (SAE Paper No. 860414).

Experimental Road Test of a Noncontacting Method of Measuring I-C Engine Torque Nonuniformity, William B. Ribbens, ©1985 (SAE Paper No. 850454).

On-Line Estimation of Indicated Torque in IC Engines Using Nonlinear Observers, Sergey Drankunov, Giorgio Rizzoni and Yue-Yun Wang, The Ohio State University (SAE Paper No. 950840).

Methods of On-Board Misfire Detection, Günther Plapp, Martin Klenk and Winfried Moser, Robert Bosch GmbH (SAE Paper No. 900232).

Misfire Detection by Evaluating Crankshaft Speed — A Means to Comply with OBDII, Martin Klenk and Winfried Moser (Robert Bosch GmbH) and Werner Mueller and Wolfgang Wimmer (Audi AG) (SAE Paper No. 930399).

Diagnosis of Individual Cylinder Misfires by Signature Analysis of Crankshaft Speed Fluctuations, G. Rizzoni, University of Michigan, ©1989 (SAE Paper No. 890884).

Measurement of Engine Misfire in the Lamborghini 533 V-12 Engine Using Crankshaft Speed Fluctuations, P. Azzoni and G. Cantoni (ENEA), G. Minelli and D. Moro (Università di Bologna), Giorgio Rizzoni (The Ohio State Univ.), M. Ceccarani and S. Mazzetti (Lamborghini Automobili) (SAE Paper No. 950837).

The Effect of Engine Misfire on Exhaust Emission Levels in Spark Ignition Engines, Ahmed Soliman, Giorgio Rizzoni, and Vasanth Krishnaswami, Ohio State University (SAE Paper No. 950480).

O=INDUCED MISFIRE
X=DETECTED MISFIRE

SPATIAL FREQUENCY IMPLEMENTED DIGITAL FILTERS FOR ENGINE MISFIRE DETECTION

BACKGROUND OF THE INVENTION

1. Technical Field

The present invention relates generally to internal combustion engines and, more particularly, to a bank of spatial frequency-implemented digital filters, each being automatically activated over a given range of engine speeds, that filters a sensed engine speed signal to improve the signature of the signal for engine misfire detection purposes.

2. Discussion

Government regulations require automobile manufacturers to control the exhaust of engine combustion byproducts, such as hydrocarbons, carbon monoxide, and nitrous oxide. Emission of such byproducts is typically controlled through implementation of a catalytic converter which operates at a high temperature and, through the use of a catalyst, burns the aforementioned unwanted exhaust byproducts to reduce automobile emissions. By implementing catalytic converters into the exhaust systems of an automobile, automobile manufacturers are able to comply with government regulations in a cost-effective manner.

However, if an automobile engine misfires, an increased amount of unburned combustion byproducts is passed through the catalytic converter. Engine misfire occurs as a result of the absence of spark in a cylinder, poor fuel metering, poor compression, or other similar conditions. Over time, regular engine misfire can lead to damage of the catalyst in the catalytic converter and, consequently, increased amounts of unburned byproducts being admitted into the atmosphere.

As a result, regulatory agencies such as the California Air Resources Board (CARB) require that many motor vehicles with feedback fuel control systems be equipped with an emission malfunction indicator that identifies a misfiring engine and the particular malfunctioning component or components. Thus, upon the malfunction indicator being activated, the vehicle operator could proceed to a qualified vehicle repair center to have the malfunctioning component repaired or replaced before an excessive amount of exhaust byproducts is emitted into the air by the vehicle.

Typically, the above mentioned malfunction indicators generate data allowing identification of specific misfiring engine cylinders. In particular, the CARB rules, known as On-Board Diagnostics II guidelines, mandate that the automobile manufacturer specify a percentage of misfires out of the total number of firing events necessary for determining malfunction for: (1) the percent misfire evaluated in a fixed number of revolution increments for each engine speed and load condition which would result in catalyst damage; (2) the percent misfire evaluated in a certain number of revolution increments which would cause a motor vehicle to fail a federal test procedure by more than 1.5 times the CARB standard if the degree of misfire were present from the beginning of the test; and (3) the degree of misfire evaluated in a certain number of revolution increments which would cause a motor vehicle to fail inspection and a maintenance program tailpipe exhaust emission test. It is contemplated that similar rules are or may be implemented by other states as by the federal government in the foreseeable future.

Government regulations such as those mandated by CARB also require that automobile manufacturers be able to provide information identifying misfiring engine cylinders. This misfire information is typically collected and stored in a computer memory associated with the automobile engine and later downloaded at a service center and is used in diagnostic testing of the vehicle. One misfire detection and identification approach is disclosed in U.S. Pat. No. 5,361,629, issued Nov. 8, 1994 entitled "Single Sensor Misfire Detection Apparatus and Method for an Internal Combustion Engine" which is incorporated herein by reference. The misfire detection approach disclosed in the aforementioned patent senses crankshaft rotation and calculates a crankshaft velocity based on the sensed rotation. The calculated crankshaft velocity changes or a compensated velocity change is compared to a predetermined crankshaft velocity range to determine engine misfire.

Additional engine misfire detection approaches are disclosed in pending U.S. patent application Ser. No. 08/468,117 filed Jun. 6, 1995 for "Engine Misfire Detection with Compensation for Normal Acceleration of Crankshaft", now U.S. Pat. No. 5,574,217; U.S. patent application Ser. No. 08/469,040 filed Jun. 6, 1995 for "Engine Misfire Detection with Rough Road Inhibit", now U.S. Pat. No. 5,544,521; and U.S. patent application Ser. No. 08/468,113 filed Jun. 6, 1995 for "Engine Misfire Detection with Cascade Filter Configuration", now U.S. Pat. No. 5,602,331. The aforementioned applications are assigned to the assignee of the present application and are incorporated herein by reference. The approaches disclosed in the above mentioned patent applications relate to engine misfire detection including sorting of a plurality of changes in crankshaft angular velocity over a predetermined series of cylinder firings in averaging the two middle most angular velocity changes to provide an average change in velocity value. The deviation is determined between the change in angular velocity for a selected cylinder and the average change in velocity value. Misfires are detected as a function of a comparison of the deviation with a predetermined threshold velocity value.

Generally, a number of conventional misfire detection approaches work well at engine speeds below 4000 rpm. At these lower engine speeds, with cylinder identification engine misfire detection can be implemented through monitoring of engine rpm alone. Even at low engine speeds, however, transient signals caused by conditions such as powertrain bobble, engine noise, changing of gears, or engine acceleration and deceleration may cause false engine misfire detection. Additionally, at higher engine speeds of typically greater than 4,000 rpm, engine induced crankshaft flex, or torsional vibration, can cause false engine misfire detection.

To reduce the number of false engine misfire detections, the approach disclosed in pending U.S. application Ser. Nos. 08/511,125 filed Aug. 4, 1995 for "Engine Misfire Detection with Digital Filtering", now U.S. Pat. No. 5,633,456, also assigned to the assignee and incorporated herein by reference, was developed to filter out noise related signals at both low and high engine frequencies to achieve an enhanced signal to noise ratio for detecting engine cylinder misfires. A crankshaft velocity signal is generated by measuring the amount of time expired over a 40° crankshaft angular displacement interval for a cylinder expansion stroke. A digitally implemented high pass finite impulse response (FIR) filter is implemented at low engine speeds to filter out low frequency engine noise. At high engine speeds, a low pass FIR filter is implemented to filter out high frequency engine noise from the crankshaft rotation signal.

In addition, many conventional misfire detection approaches analyze engine firing frequency through a fast fourier transform (FFT) or other similar frequency domain-based analysis to determine whether an engine misfire has occurred for a particular cylinder firing event. However, the aforementioned approaches are typically complex in implementation and do not take into account manifold absolute pressure (MAP) in setting a particular threshold value for engine misfire detection.

Further, many conventional misfire detection methods utilize low data rate sampling of engine crankshaft velocity or acceleration. With low data rate sampling, higher multiples of the engine firing frequency, which often contain valuable misfire information for higher engine speeds, frequently are folded back, or aliased, into lower noise-related engine frequencies. These aliased signals are either filtered out completely from the misfire detection signal or cause misinterpretation of cylinder firing event data.

While the above described approaches represent generally effective engine misfire detection techniques, there is room for improvement in the art. In particular, there is a need for an engine misfire detection technique that samples angular crankshaft velocity at a high data rate so that change in crankshaft angular velocity over a given band of engine frequencies around the engine firing frequency may be determined to produce more accurate engine misfire calculations. Also, there is a need for an engine misfire detection method in which one of a multiple of FIR filters is implemented according to a predetermined range of engine speeds to provide effective removal of noise related signals from the crankshaft angular velocity signal to thereby improve the signature of the signal and thus enhance the accuracy of associated misfire detection methodology.

SUMMARY OF THE INVENTION

According to a preferred embodiment of the present invention, a digital filter system for an internal combustion engine misfire detection system is provided. The digital filter system includes a signal input for inputting a digital signal generated in response to sensed crankshaft angular velocity. A plurality of digital filters is connected to the signal input, with each of the filters being activated over a predetermined range of engine speeds. Each of the plurality of digital filters, upon being activated, operates as a bandpass filter to filter the digital signal at an engine spatial firing frequency and at a predetermined number of multiples of the engine spatial firing frequency. A signal output is also connected to the plurality of digital filters for outputting the filtered digital signal for engine misfire detection purposes.

DETAILED DESCRIPTION OF THE DRAWINGS

Figure 4:
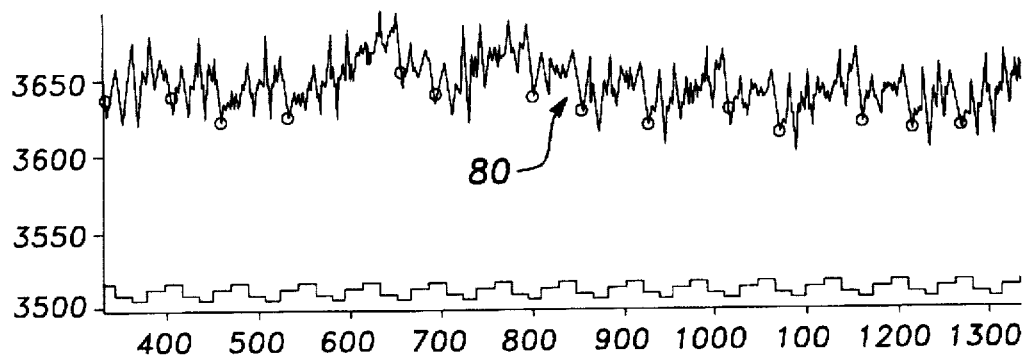
Figure 5:
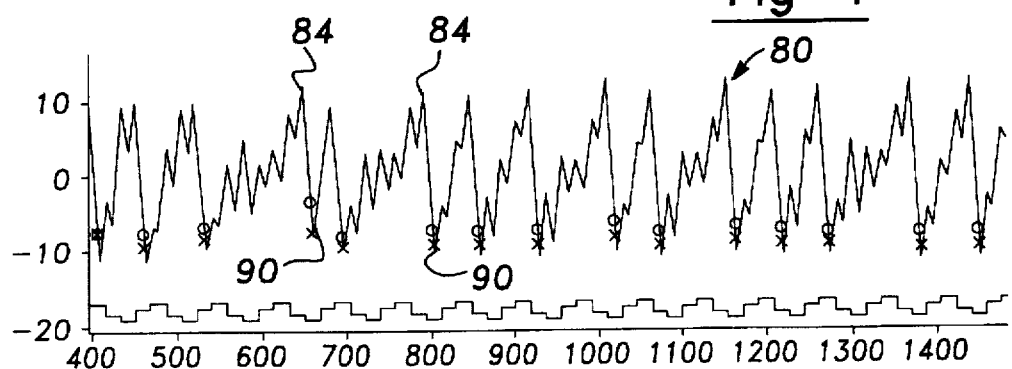
Figure 6:
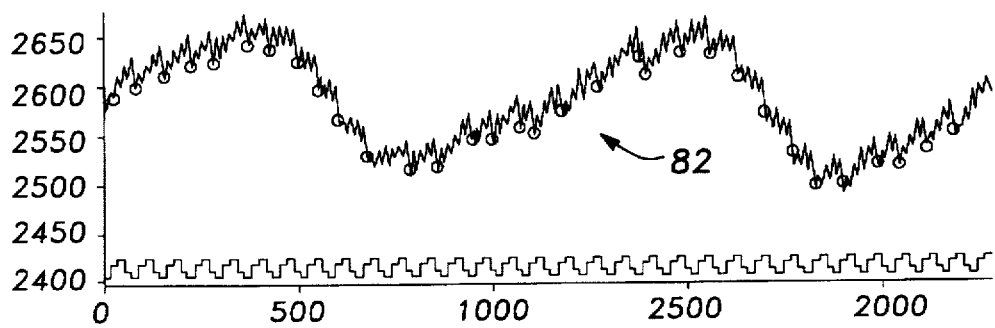
Figure 7:
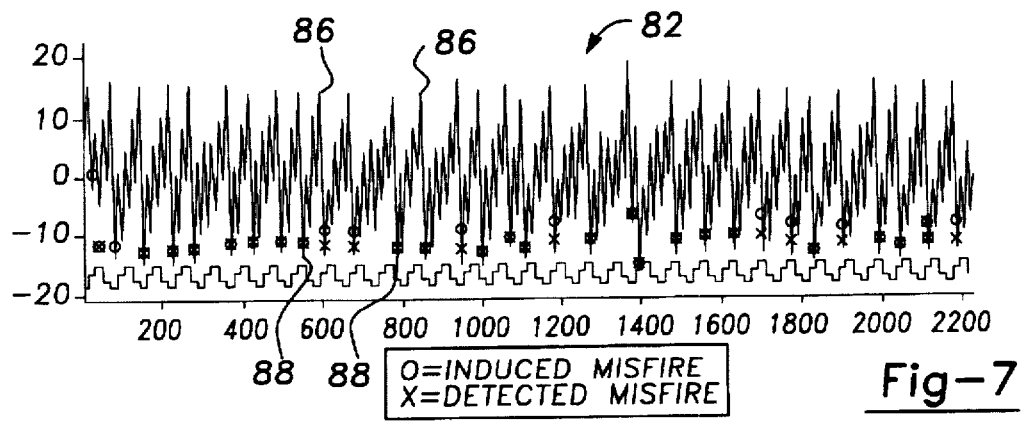
Figure 8:
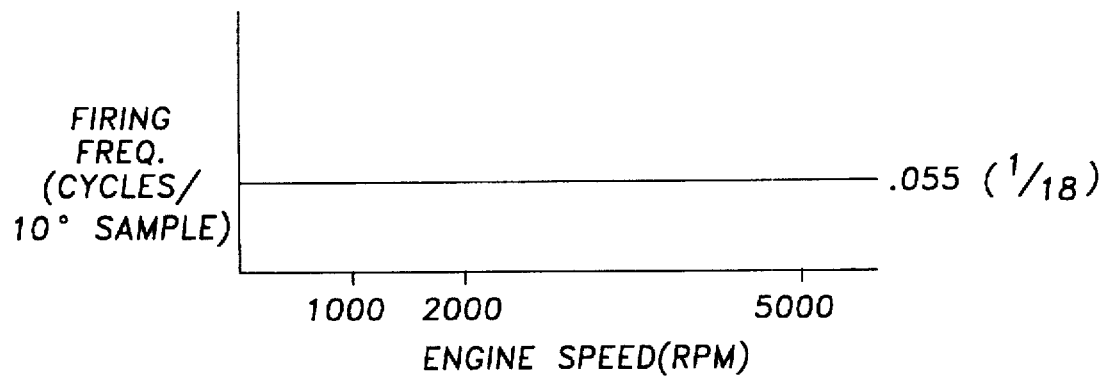
Figure 9:
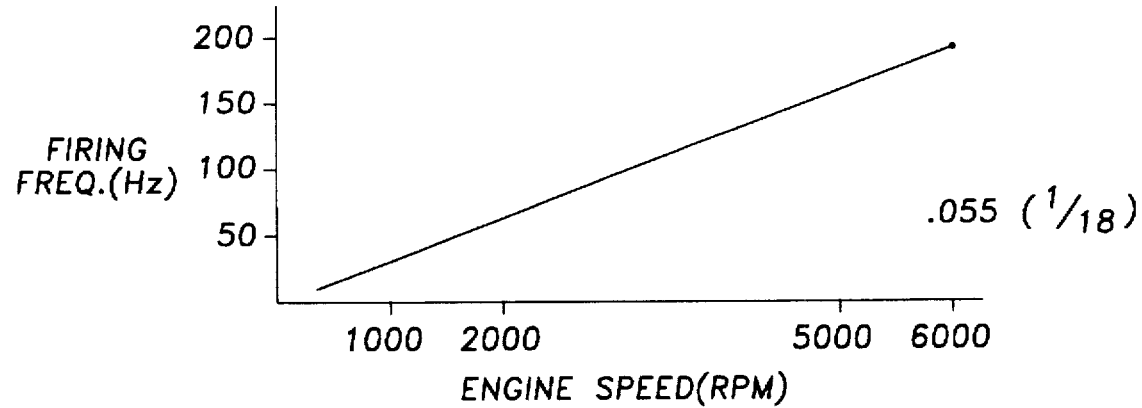

FIG. 4 graphically illustrates a sensed non-filtered engine speed signal generated over a number of crankshaft angular velocity samples at a first engine speed and average MAP pressure;

FIG. 5 represents the engine speed signal of FIG. 4 subsequent to digital filtering of the signals by the digital filtering bank of the present invention;

FIG. 6 illustrates a sensed non-filtered engine speed signal generated over a number of crankshaft angular velocity samples over a number of samples at a second given engine speed and average MAP pressure;

FIG. 7 illustrates the signal of FIG. 6 subsequent to digital filtering of the samples by the digital filtering bank of the present invention;

FIG. 8 graphically illustrates the relationship between engine firing frequency, measured in cycles/10° sample, versus engine speed; and FIG. 9 graphically illustrates the relationship between engine firing frequency, in Hz, versus engine speed.

DETAILED DESCRIPTION OF THE PREFERRED EMBODIMENT

Referring now to the drawing figures, a block diagram of the engine system, in which the misfire detection system of the present invention is implemented, is shown generally at 10. The system 10 includes an internal combustion spark ignited engine 12, shown in partial cross-section, which is of the type implemented in a conventional motor vehicle (not shown). The engine contains a plurality of cylinders, represented by the cylinder 14, with each of the cylinders having a piston, represented by the piston 16, operatively disposed therein. Each of the pistons is connected by a connecting rod 18 to a crankshaft 20. A conventional engine cam shaft 22 is also operatively located within the engine for opening and closing an intake valve or valves, such as the valve 24, associated with the cylinder 14 for supplying a fuel/air mixture to the cylinders in a manner well known in the art during the piston intake stroke. A manifold 25 is also operatively associated with the intake valve 24 for supplying air from outside of the engine into the cylinder 14 to provide air for the valve fuel/air mixture supplied to the cylinder.

The engine 12 is a conventional four-cylinder, four-stroke engine having an intake stroke in which fuel and air mixture is input into the cylinder 14 through the intake valve 24, a compression stroke in which the fuel/air mixture is compressed by the piston 16, an expansion stroke in which a spark supplied by a spark plug 26 ignites the fuel/air mixture, and an exhaust stroke during which gases from the burned fuel are exhausted from the cylinder through an exhaust system 28 having a catalytic converter 29 with an associated catalyst 30. Although the preferred embodiment of the present invention is implemented in a four cylinder, four-stroke engine such as that shown at 12, it should be appreciated that the present invention may be implemented in any conventional engine system, including a two-stroke engine system, or any spark ignited or diesel engine system.

Figure 1:
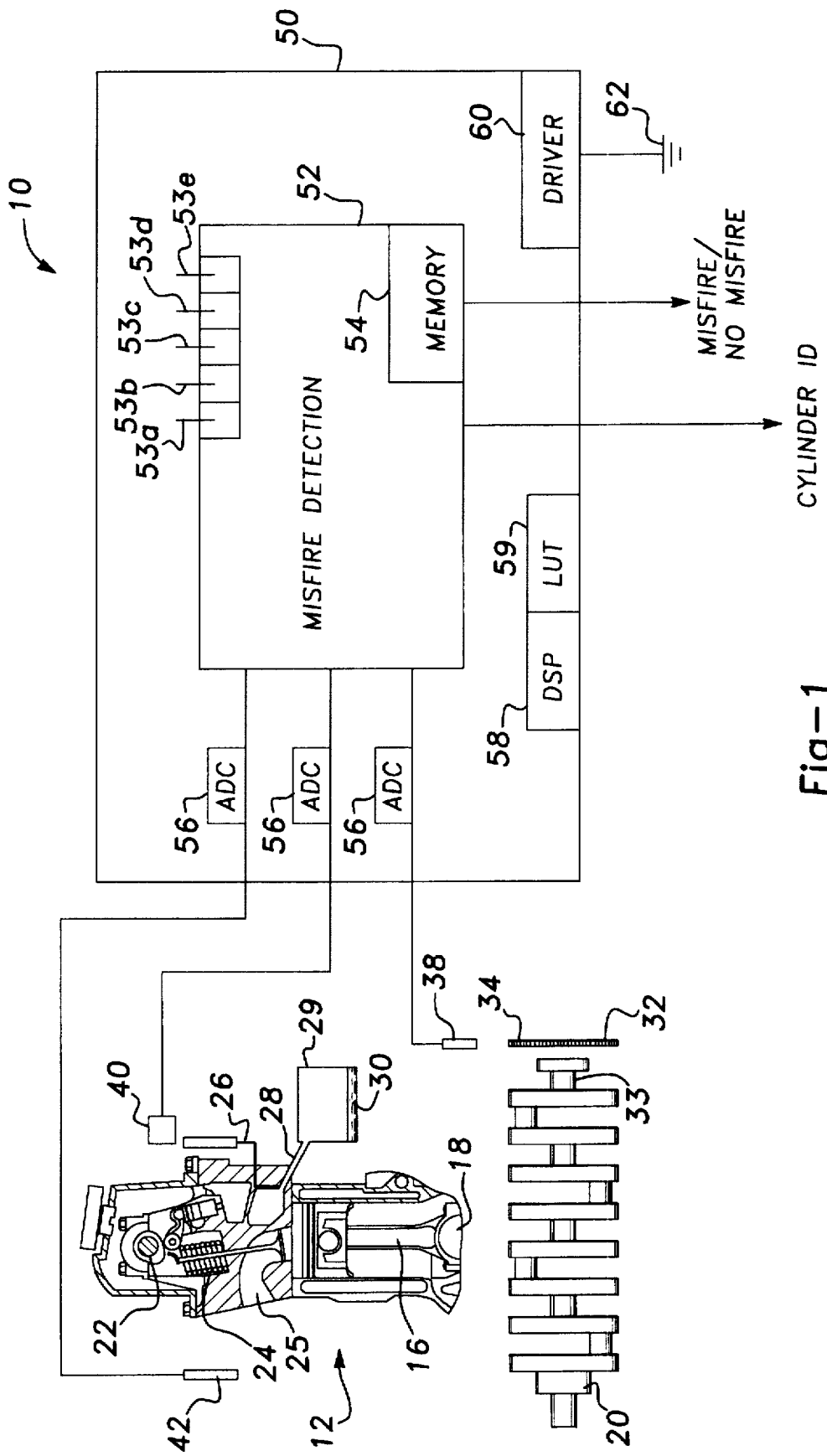
FIG. 1 illustrates a side elevational view of a spark-ignited internal combustion motor vehicle engine in cross-section, a crankshaft associated with the engine, and a block diagram of a motor vehicle electronic control unit in which the spark advance control of the present invention is implemented.
Figure 2:
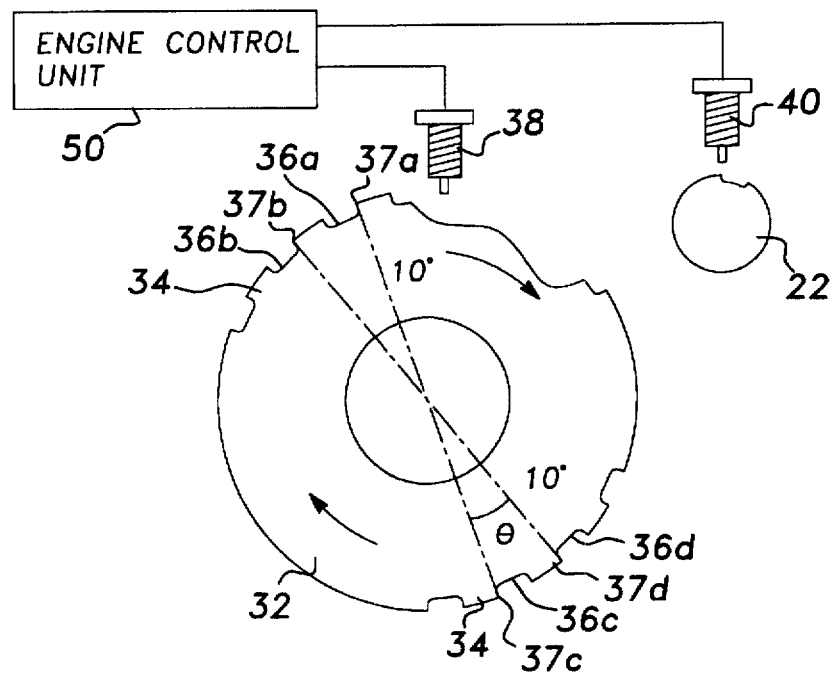
FIG. 2 is an enlarged front view of the crankshaft sensor wheel and crankshaft sensor shown in FIG. 1.

Still referring to FIG. 1, a crankshaft sensor wheel 32 is operatively fastened to a sensor wheel mount nose 33 by screws or other similar fastening devices. The sensor wheel mount nose is in turn welded or otherwise operatively connected to the crankshaft by spot welding or any other similar technique. Referring to FIG. 2, the crankshaft sensor wheel 32 includes a plurality of teeth 34 defining slots 36 therebetween. The slots 36 operate as crankshaft angular velocity sensing points for measuring the angular velocity of the crankshaft, and thus the engine speed. It should be understood that the terms engine speed and crankshaft angular velocity are directly proportional to one another and may be used interchangeably throughout the specification.

Referring to FIG. 2, it should be appreciated that the engine cylinders 14 are oriented in a conventional straight-line configuration. As a result, each cylinder has a 180° expansion stroke with a cylinder firing order of 1-3-4-2.

Angular velocity measurements for the crankshaft 20 are measured by determining the time period for crankshaft angular displacement Θ for preferably a 10° expansion stroke interval for each of the four cylinders before the piston reaches top dead center (TDC) at the end of the expansion stroke. This 10° interval is preferably near the end of the piston expansion stroke. By measuring the time period for each 10° angular displacement of the crankshaft, a high data rate (HDR) sampling of the crankshaft is achieved.

More specifically, a slot 36a is formed in the crankshaft wheel 32 at a position corresponding preferably to a piston position of about 19° before top dead center (TDC) in the piston expansion stroke. At least one slot 36b is formed in the sensor wheel 32 adjacent the slot 36a and preferably at a position corresponding to a piston location at 9° before TDC. However, it should be appreciated that other slots may be formed in the crankshaft sensor between the slots 36a, 36b to initiate ignition timing control or for other timing purposes. First and second edges 37a, 37b are associated with the first and second slots 36a, 36b. The first edge 36a corresponds to the initiation of crankshaft angular velocity measurements for cylinder numbers 1 and 4 in the four cylinder engine arrangement, while the second edge corresponds to the termination of these measurements. Additionally, two other slots 36c, 36d are formed in the crankshaft sensor wheel 32 to form third and fourth edges 37c, 37d oriented 180° apart on the crankshaft sensor wheel from the slot edges 37a, 37b.

The system 10 also includes a crankshaft sensor 38 in communication with the sensor wheel 32, and a cam position sensor 40 in communication with the cam shaft 22. Both the crankshaft sensor 38 and the cam shaft sensor 40 generate signals used by the misfire detection system of the present invention in a manner discussed in detail below. The crankshaft sensor 38 measures time elapsed between rotation of slot edges 37a, 37b, and edges 37c, 37d and other corresponding slot edges past the crankshaft sensor 38. The sensor crankshaft subsequently generates an analog signal corresponding to this rotation time period that is utilized in determining crankshaft angular velocity, and thus engine speed, as will be described in detail below.

The cam shaft sensor 40 is utilized for identification of specific cylinder firing events and is implemented based on the fact that the cam shaft 22 rotates 360° for every 720° of rotation of the crankshaft 20. Cylinder firing event identification enables the misfire detection system of the present invention to calculate which cylinder or cylinders are misfiring. The engine system 10 preferably uses a stock cam sensor and associated cylinder identification technique to determine the TDC of the number 1 cylinder. However, other cylinder identification techniques may be implemented according to the specific engine system.

The system 10 additionally includes a manifold absolute pressure (MAP) sensor 42 for measuring fluctuations in the air pressure in the manifold 25. Additional engine system components and sensors are not shown, as such components and sensors are conventionally implemented and are well known to those skilled in the art. It should be appreciated at this point that the crankshaft sensor 38, the cam shaft sensor 40, and the MAP sensor 42 may be Hall effect sensors, optical sensors, variable reluctance sensors, or any other type of sensors well known in the art. Each of the sensors 38, 40 and 42 generate an analog signal representative of the sensed condition and communicates this analog signal to an electronic control unit (ECU) 50 which is implemented along with other control circuitry (not shown) within the motor vehicle.

The ECU 50 includes a micro-controller 52 having an associated memory 54 and analog to digital converters 56 for converting analog signals from the sensors 38, 40, 42 to digital signals. The memory 54 is a memory of the type well known in the art, such as random access memory (RAM), read-only memory (ROM), or any other similar type of conventional computer memory. A digital signal processor 58, also implemented at the ECU 50, processes outputs from the analog to digital converters 56 to condition the signals from the sensors 38, 40, 42 for use in the misfire detection system of the present invention. Additionally, a look-up table 59 is implemented in the ECU 50 for storing MAP-dependent change in engine speed threshold values for use in the misfire detection pattern recognition methodology of the present invention described below. The ECU 50 also includes a lamp driver 60 which, upon the appropriate output signal being generated by the micro-controller 52, drives an output display such as a driver warning light 62. The electronic control unit further includes additional timers, counters and like components of the type typically associated with a conventional micro-controller and which are used to implement the present invention.

Still referring to the ECU 50, the micro-controller 52 is configured to implement a plurality of finite impulse response (FIR) digital filters 53a–53e. The FIR digital filters are preferably designed as X order filters including X+1 filter coefficients.

In the present invention, filter 53a has 24 coefficients and filters 53b–53e have 8 coefficients. These filters are implemented presently in the spatial domain as a sum of products of individual filter coefficients $c_o$–$c_7$ with eight sequential samples of crankshaft angular velocity. By forming $$fv_k = \sum_{i=0}^{7} c_i v_{k+i}, k = 0, \ldots,$$

where $v = [v_k, k = 0 \ldots]$ is the sampled crankshaft angular velocity. After choosing the frequency band for misfire detection in each speed range, filter design routines, commonly available in Matlab and other digital signal processing software packages, can generate the coefficients $c = [c_0, \ldots, c_7]$ which are used in the digital filters.

The filter coefficients are preferably predetermined and programmed into the micro-controller memory 54. Preferably, a high pass FIR filter 53a is implemented on a full-time basis to filter out low frequency transients, which typically occur at frequencies below about one-quarter of the engine firing frequency and are caused by engine noise, or engine acceleration and deceleration. Additionally, band pass FIR filters 53b–53e are each selectively activated over a particular range of engine speeds to filter higher frequency noise related signals from the crankshaft angular velocity signals caused by such phenomena as the inherent flexing, or torsional vibration, of the crankshaft 20. The FIR filters 55a–55e thereby enhance the signature of the signal generated by the crankshaft sensor. Preferably, the filters 53b–53e are implemented over the following engine speed ranges:

(1) idle to 3000 rpm
(2) 3000 to 4500 rpm
(3) 4500 to 5500 rpm
(4) 5500 rpm to redline.

However, this method could use a different number of filters, or, different speed ranges.

While FIR digital filters are shown and described as being implemented with the present invention, it should also be appreciated that other digital filters, such as infinite impulse response filters, could alternately be implemented in the present invention.

More particularly, the band pass filters 53b–53e are spatial frequency implemented filters, where spatial frequency is defined as engine speed per 10° crankshaft angular velocity sample. Preferably, the spatial frequency band pass of each filter is set according to a the frequencies needed for misfire detection and are designed through the use of Matlab or other similar software program. The digital filters of the present invention are designed as such to allow a misfire detection system, such as that disclosed in pending U.S. patent application Ser. No. 08/691,100, filed concurrently herewith, for "Real-Time Misfire Detection for Automotive Engines", which is assigned to the assignee of the present application and incorporated herein by reference. The digital filters of the present invention permit a signal corresponding to crankshaft angular velocity, and thus engine speed, to pass at the engine firing frequency. Also, the digital filters are designed to allow frequencies which are multiples of the engine firing frequency, such as those frequencies at two times the firing frequency, three times the firing frequency, and preferably up to four times the firing frequency, to pass along with the signal at the engine firing frequency. These higher multiples of the engine firing frequency are allowed to pass through the filters, as such frequencies contain information that is important to misfire detection.

May conventional misfire detection techniques utilize low data rate sampling for crankshaft angular velocity. In such techniques, the above-referenced higher multiples of the engine firing frequency often are aliased into lower frequencies of the engine speed signal and thereby can cause inaccurate misfire detection. Thus, instead of sampling a particular cylinder twice to pick up firing frequency, as is done with many conventional misfire detection techniques, the present invention samples the cylinder eighteen (18) times, or for every 10° degrees of movement of the piston within the cylinder, to pick up the firing frequency along with multiples thereof up to nine (9) times the firing frequency. The present invention thereby samples at a high data rate and thus eliminates the occurrence of aliasing, thereby minimizing the occurrence of false misfire detection.

The digital band pass filters 53b–53e are implemented in the above-defined spatial frequency domain, as the number of engine cycles per 10° sample programmed into the ECU is a constant value as shown generally at 60 in FIG. 9. The digital band pass filters 53b–53e of the present invention are not implemented in the temporal frequency domain, as the engine speed firing frequency domain, measured in hertz, varies with engine speed as shown at 62 in FIG. 10. Therefore, if the filters were implemented with engine speed sampled in uniform time samples, many more filters would be required than the four presently needed. By implementing the digital filters of the present invention in the spatial frequency domain, the filter coefficients can thus be chosen as constants over a given range of engine speeds, as the number of cycles per cylinder firing event remains constant. Therefore, each of the four digital filters 53b–53e of the present invention passes the crankshaft angular velocity signal for a band of frequencies around the engine misfire frequency for engine misfire detection purposes. Once the crankshaft angular velocity signal is filtered by the filters 53b–53e, misfire detection may be detected based on average MAP pressure and the engine speed alone, with spatial frequency analysis, without playing a role in the misfire detection technique subsequent to signal filtering.

Figure 3:
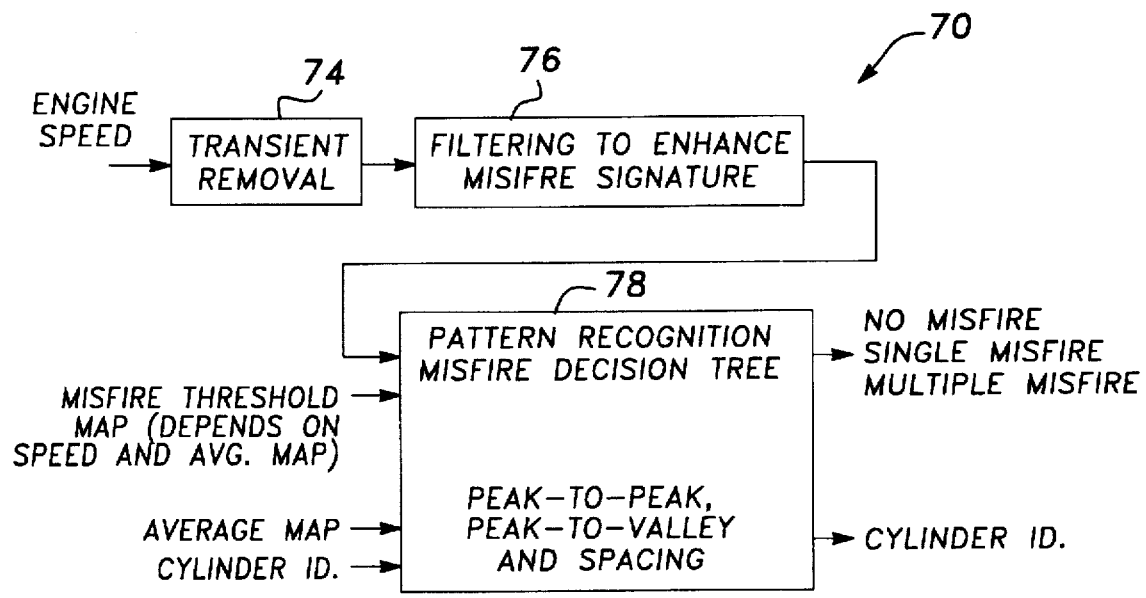
FIG. 3 is an overall system block diagram of the misfire detection system according to a preferred embodiment of the present invention.

Referring to FIG. 3, a block diagram illustrating the implementation of the engine misfire detection system of the present invention is shown generally at 70. Engine speed, which is measured as crankshaft angular velocity by the crankshaft sensor 38, subsequent to being conditioned through the analog to digital converters 56 and the digital signal processor 58, is input into the high pass FIR filter 53a for removal of transient signals, as is indicated at block 74. Subsequently, as indicated at block 76, the crankshaft angular velocity signal is input into one of the FIR digital band pass filters 53b–53e, each of which is activated according to a particular range of engine speeds programmed into the memory 54, to remove high frequency noise-related signals such as torsional vibration to enhance the signature of the signal. At block 78, the crankshaft sensor signal, along with a threshold MAP signal, an average MAP signal, and a cylinder identification signal generated by the camshaft sensor 40 are input into a pattern recognition misfire decision tree, implemented in accordance with the present invention, to determine the occurrence of engine misfire. The signature of the crankshaft velocity signal input for misfire detection is thus greatly improved. Only the signal corresponding to a particular band of engine speed frequencies, including the firing frequency and multiples thereof, preferably up to and including signals corresponding to four times the engine firing frequency, is passed from the digital band pass filters 53b–53e to pattern misfire signature methodology for engine misfire detection purposes.

Referring to FIGS. 4 and 5, an engine speed signal is shown for the four cylinder, four-stroke, two cycle engine 12 at a speed of 1350 rpm and MAP 400 pressure of Torr for a plurality of 10° samples taken over numerous cylinder firing events. In FIG. 4, the engine speed signal 80 is shown taken over in an unfiltered state and prior to filtering by the filters 53a–53e. In FIG. 5, the signal 80 is shown subsequent to filtering by the digital FIR filters 53a–53e over the same sampling period plotted in FIG. 5.

Similarly, FIG. 6 shows an engine speed signal 82 for the engine 12 at a speed of 2500 rpm and at a MAP pressure of 200 Torr over a plurality of 10° samples for numerous cylinder firing events. FIG. 7 shows the signal 82 after the signal has been filtered by the digital FIR filters 53a–53e.

As is evident, the digital filters implemented in the present invention greatly enhance the detection of successive cylinder firing events, represented by peaks such as those at 84 and 86, in the graphs shown in FIGS. 5 and 7, and of the subsequent minimum engine spreads, such as those at 88 and 90, signalling possible engine misfire. The filters thereby enhance the accuracy of an engine misfire detection system such as that in the pending application filed concurrently herewith for "Real-Time Misfire Detection for Automobile Engines" which has been incorporated by reference.

From the foregoing description, it should be appreciated that the spatial frequency domain digital filter bank of the present invention, when implemented with a misfire detection system utilizing high data rate sampling of the crankshaft angular velocity, prevents aliasing of the crankshaft angular velocity signal at frequencies that are multiples of the engine firing frequency. The high data rate sampling prevents these higher multiples of engine speed firing frequency from being filtered from the crankshaft angular velocity signal prior to the engine misfire detection methodology evaluating the signal. These higher multiples contain information that is important in misfire detection at all engine speeds. The spatial frequency domain digital filter bank of the present invention, when implemented in an engine misfire detection system, greatly enhances the signature of the crankshaft angular velocity signal and thus improves the accuracy of the misfire detection methodology.

While the above detailed description describes the preferred embodiment of the present invention, the invention is susceptible to modification, variation and alteration without deviating from the scope and fair meaning of the subjoined claims.

What is claimed is:

1. A digital filter system for an internal combustion engine misfire detection system, comprising:

a signal input for inputting a digital signal generated in response to sensed crankshaft angular velocity;

a plurality of precalculated digital filters each being activated over a predetermined range of engine speeds, each of said plurality of digital filters, upon being activated, operating as a band pass filter to pass a band of frequencies of said digital signal including an engine spatial firing frequency and a predetermined number of multiples of said engine spatial firing frequency; and a signal output for outputting said filtered digital signal for engine misfire detection purposes.

2. The digital filter system of claim 1, wherein said predetermined number of multiples of said engine firing frequency comprises signals at from a fraction to four times said engine firing frequency.

3. The digital filter system of claim 1, wherein each of said digital filters includes X+1 filter coefficients, with X being the number of samples taken during a cylinder firing event.

4. The digital filter system of claim 3, wherein said filter coefficients are generated by filter design routines.

5. The digital filter system of claim 1, wherein said plurality of digital filters comprises a plurality of finite infinite response digital filters.

6. The digital filter system of claim 5, wherein said first digital filter is activated at an engine speed range of idle to 3000 rpm, said second digital filter is activated at an engine speed of 3000 rpm to 4000 rpm, said third digital filter is activated at an engine speed of 4500 rpm to 5500 rpm, and said fourth digital filter is activated at engine speeds of about 5500 rpm to redline, for a four cylinder engine.

7. The digital filter system of claim 6, further comprising a fifth high pass FIR filter for filtering transients from said digital system.

8. An internal combustion engine misfire detection system, comprising:

an internal combustion engine;

a crankshaft operatively associated with said engine for transferring torque from said engine to motor vehicle wheels;

sensor means associated with said crankshaft for generating a crankshaft angular velocity signal for use in determining engine speed;

a digital filter input connected to said sensor means for receiving said crankshaft angular velocity signal;

a plurality of precalculated digital filters, each being activated over a predetermined range of engine speeds, each of said plurality of digital filters, upon being activated, being operative as a band pass filter to pass said crankshaft angular velocity signal at a band of frequencies having a range from a fraction of an engine spatial firing frequency and a predetermined number of multiples thereof;

a digital filter signal output for outputting said band of frequencies of said filtered crankshaft angular velocity signal; and misfire detection means for detecting misfire of said engine through analysis of said band of frequencies of said filtered crankshaft angular velocity output signal.

9. The system of claim 8, further comprising an analog to digital converter implemented between said sensor means and said digital filter input for converting said signal generated by said sensor means to a digital signal.

10. A method of implementing a plurality of digital filters for use in an internal combustion engine misfire detection system, comprising the steps of:

generating a crankshaft angular velocity signal;

activating one of a plurality of precalculated digital filters in response to said crankshaft angular velocity;

filtering said crankshaft angular velocity signal through said activated digital filter to pass said crankshaft angular velocity signal at a band of frequencies from a fraction of an engine firing frequency to a predetermined multiple of said firing frequency; and outputting said band of frequencies of said filtered crankshaft angular velocity signal to misfire detection means for engine misfire detection purposes.

11. The method of claim 10, wherein said step of implementing a plurality of digital filters comprises implementing a plurality of finite impulse response (FIR) digital filters.

12. The method of claim 10, further comprising the step of programming coefficients of said FIR filters into memory means prior to implementation of said misfire detection means.

13. The method of claim 10, wherein said step of implementing a plurality of digital filters comprises implementing a plurality of digital infinite impulse response filters.

14. A digital filter system for an internal combustion engine misfire detection system, comprising:

a signal input for inputting a digital signal generated in response to sensed crankshaft angular velocity;

a plurality of digital filters each being activated over a predetermined range of engine speeds, each of said plurality of digital filters, upon being activated, operating as a band pass filter to pass a band of frequencies of said digital signal including an engine firing frequency and a predetermined number of multiples of said engine firing frequency;

a signal output for outputting said filtered digital signal; and engine misfire detection means that compares said filtered digital signal output from said signal output and that compares said filtered digital signal output to a fixed misfire detection standard to determine if an engine misfire has occurred.

* * * * *